(12) United States Patent  
Muskus et al.

(10) Patent No.: US 7,896,748 B2  
(45) Date of Patent: Mar. 1, 2011

(54) COUPLING APPARATUS

(75) Inventors: Wieslaw Muskus, Whethersfield, CT (US); Jyotish Parekh, West Hartford, CT (US); Jeffrey Post, South Windsor, CT (US)

(73) Assignee: Kamatics Corporation, Bloomfield, CT (US)

( * ) Notice: Subject to any disclaimer, the term of this patent is extended or adjusted under 35 U.S.C. 154(b) by 0 days.

(21) Appl. No.: 11/858,578

(22) Filed: Sep. 20, 2007

(65) Prior Publication Data  
US 2008/0039217 A1 Feb. 14, 2008

Related U.S. Application Data

(63) Continuation of application No. 10/963,209, filed on Oct. 11, 2004, now abandoned.

(51) Int. Cl.  
F16D 3/00 (2006.01)
(52) U.S. Cl. .......................................... 464/79; 464/80
(58) Field of Classification Search .................. 403/50, 403/51; 277/647, 916, 634, 635, 636, 644; 464/79, 80, 88; 92/34–74; 285/903; 138/173  
See application file for complete search history.

(56) References Cited

U.S. PATENT DOCUMENTS

| 1,523,951 | A |   | 1/1925  | Fulton |  |
|---|---|---|---|---|---|
| 1,818,797 | A |   | 8/1931  | Feyens |  |
| 3,455,013 | A |   | 7/1969  | Rayburn |  |
| 3,465,902 | A |   | 9/1969  | Gardner |  |
| 3,540,353 | A | * | 11/1970 | Langlet et al. | 92/34 |
| 3,692,337 | A |   | 9/1972  | Mischel |  |
| 4,079,757 | A |   | 3/1978  | Fischer et al. |  |
| 4,203,304 | A |   | 5/1980  | Decker |  |
| 4,235,427 | A | * | 11/1980 | Bialobrzeski | 267/153 |
| 4,309,872 | A |   | 1/1982  | Raser et al. |  |
| 4,335,587 | A |   | 6/1982  | Thomamueller et al. |  |
| 4,487,232 | A | * | 12/1984 | Kanao | 138/122 |
| 4,802,882 | A |   | 2/1989  | Heidrich |  |
| 4,881,922 | A |   | 11/1989 | Ayers |  |
| 5,000,722 | A |   | 3/1991  | Zilberman |  |
| 5,065,988 | A | * | 11/1991 | Wedell | 267/149 |
| 5,390,704 | A | * | 2/1995  | Kanao | 138/121 |
| 5,407,237 | A |   | 4/1995  | Smolowitz |  |
| 6,310,284 | B1 | * | 10/2001 | Ikeda | 174/353 |
| 6,547,814 | B2 | * | 4/2003  | Edwin et al. | 623/1.13 |

FOREIGN PATENT DOCUMENTS

| EP | 0441625 A1 | 7/1991 |
|---|---|---|
| FR | 695949 | 12/1930 |
| GB | 763089 | 12/1956 |
| GB | 820544 | 9/1959 |
| JP | 63-23066 | 11/1994 |
| WO | WO 02/084841 A1 | 10/2002 |

* cited by examiner

Primary Examiner—Aaron Dunwoody  
(74) Attorney, Agent, or Firm—Cantor Colburn LLP

(57) ABSTRACT

A single piece unitary metal coupling includes a first end, a second end, and a convolution between the first and second ends. The convolution includes at least one cylindrically-shaped tip end.

6 Claims, 5 Drawing Sheets

COUPLING APPARATUS

CROSS REFERENCE TO RELATED APPLICATION

This application is a continuation application of U.S. Ser. No. 10/963,209, filed Oct. 11, 2004 the contents of which are incorporated by reference herein in their entirety.

BACKGROUND

In order to accommodate torque transfer and potentially misalignment between rotatable members such as shafts, flexible couplings have been employed. Such couplings are connected by flanges or spline connections and are specifically designed to transmit torque from one component to the other component while absorbing and dissipating the effects of misalignment.

While many such couplings exist, all suffer from limited degree of flexibility. One common way of increasing misalignment tolerance is to incorporate additional flexible elements. This however results in a heavier and more expensive construction as well as commonly the introduction of additional stress risers occasioned by the manufacturing process. Some increased flexibility can be obtained but with diminishing returns.

A common causative factor related to prior art couplings failing is the development of fatigue fractures. These can develop both from a lack of flexibility (rigidity) overall in the coupling and from individual stress risers within the coupling. Some of the structural rigidity (material and stress risers) of currently available commercial designs comes from the means of manufacture of the coupling. One example of a process commonly associated with stress risers being introduced to a coupling is a welding process to join adjacent diaphragms. Welding causes localized phase change in the metal of the disks often resulting in a change in hardness and heat-treating properties of the coupling in the local region. Another weakness of prior art couplings is that they can have very low axial stiffness due to inherent design factors and method of construction. This low stiffness can lead to vibration problems that can produce failures of flexing elements.

The foregoing and other drawbacks inherent in the prior art have been tolerated for an extended period of time because there was no viable alternative. This fact notwithstanding, the art would be very much benefited by the availability of a more durable flexible coupling.

SUMMARY

Disclosed is a single piece unitary metal coupling includes a first end, a second end, and a convolution between the first and second ends. The convolution includes at least one cylindrically-shaped tip end.

BRIEF DESCRIPTION OF THE DRAWINGS

Referring to the exemplary drawings wherein like elements are numbered alike in the several Figures.

DETAILED DESCRIPTION

Initially in this disclosure, embodiments of the coupling itself are discussed followed by a method of manufacturing the couplings.

Figure 1:
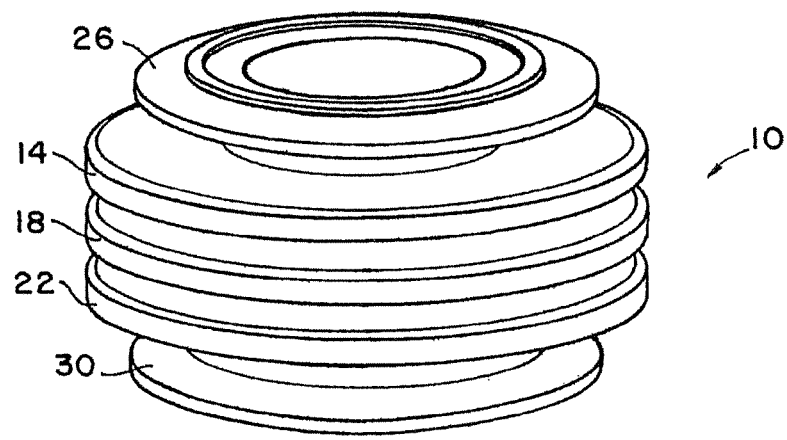
FIG. 1 is a perspective view of one embodiment of the coupling.
Figure 2:
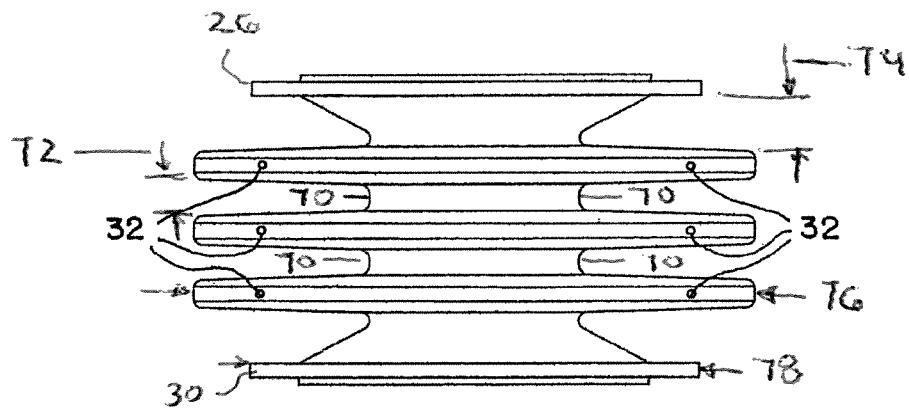
FIG. 2 is a side view of a coupling similar to that of FIG. 1.

Referring to FIG. 1, a perspective view of one embodiment of the disclosed flexible coupling 10 is illustrated. The flexible coupling 10 may be (and as illustrated is) a disk type coupling. The particularly illustrated embodiment includes three convolutions 14, 18, and 22. More or fewer convolutions may be used. The coupling 10 includes a first end 26 and a second end 30 intended to be attached to first and second shafts (not shown). Configurations for ends 26 and 30 include flanges, splined connections, threaded connections, geometric drive shapes, etc. In the FIG. 1 embodiment, the first end 26 is a first flange, and the second end 30 is a second flange. Flanges 26 and 30 are illustrated without openings but may include openings for through passage of fasteners. Also noted is that the convolutions are illustrated without openings therethrough in FIG. 1. In some embodiments of the coupling disclosed herein, openings 32 are provided (as illustrated in FIG. 2). These openings assist in nitriding processes if employed and also function to allow escape of moisture from within the coupling during use. Referring to FIG. 2, a land 70 is located between adjacent convolutions of the convolutions 14, 18, and 22. A convolution distance 72 between adjacent convolutions of the convolutions 14, 18, and 22 is substantially the same. Similarly, the first end 26 and the second end 30 are separated from the convolutions 14, 18, and 22 by an end distance 74. The convolution distance 72 is less than the end distance 74. Further, the convolutions 14, 18, and 22 have a convolution outer diameter 76 and the first end 26 and second end 30 have an end outer diameter 78. The convolution outer diameter 76 is greater than the end outer diameter 78.

Figure 3:
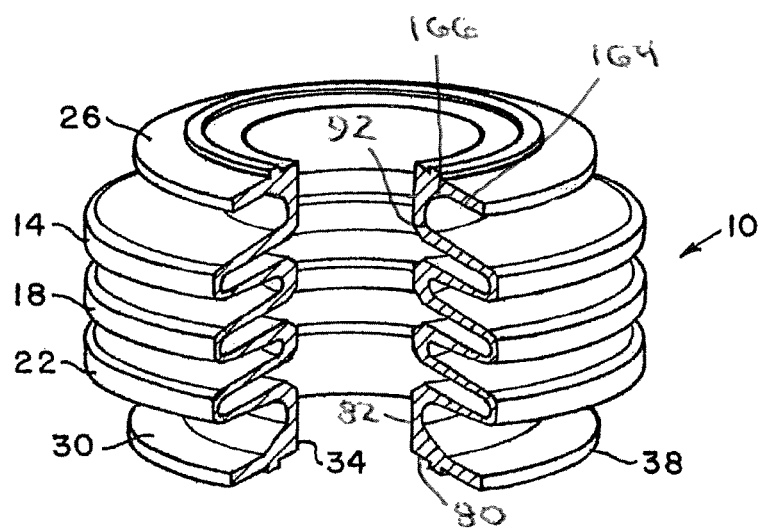
FIG. 3 is a cut-away perspective view of coupling illustrated in FIG. 1.
Figure 4:
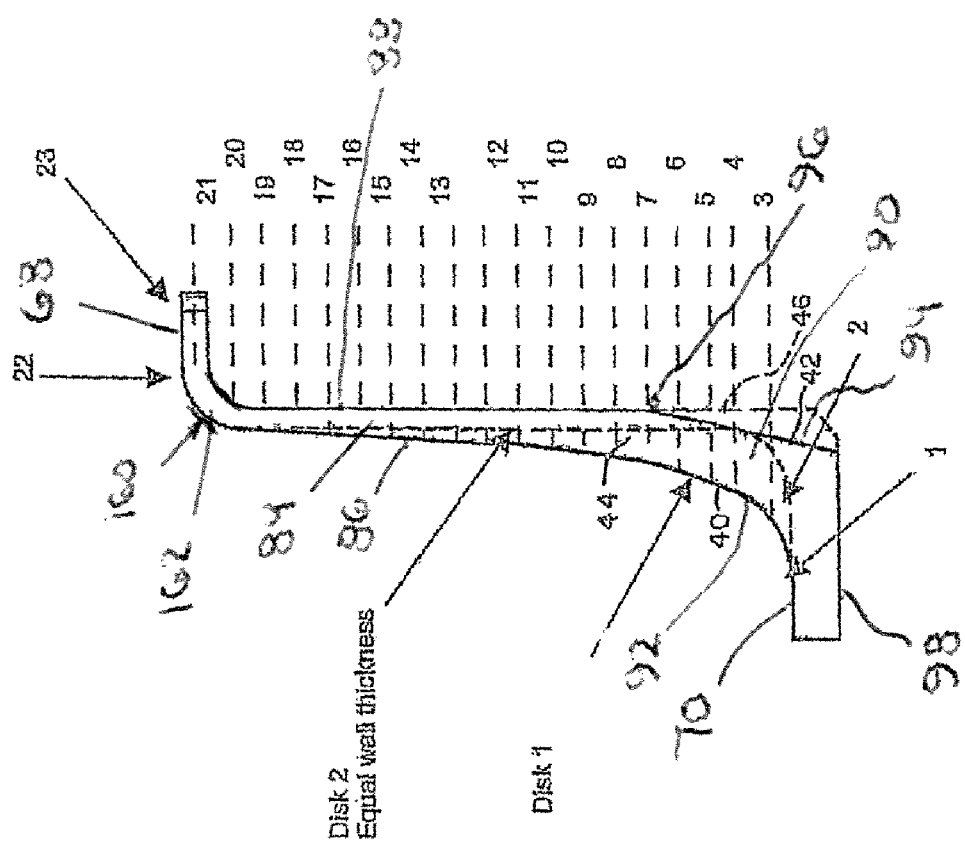
FIG. 4 is a representation of a cross-sectional view of a coupling of the invention and a fixed thickness coupling to show points for stress analysis.
Figure 5:
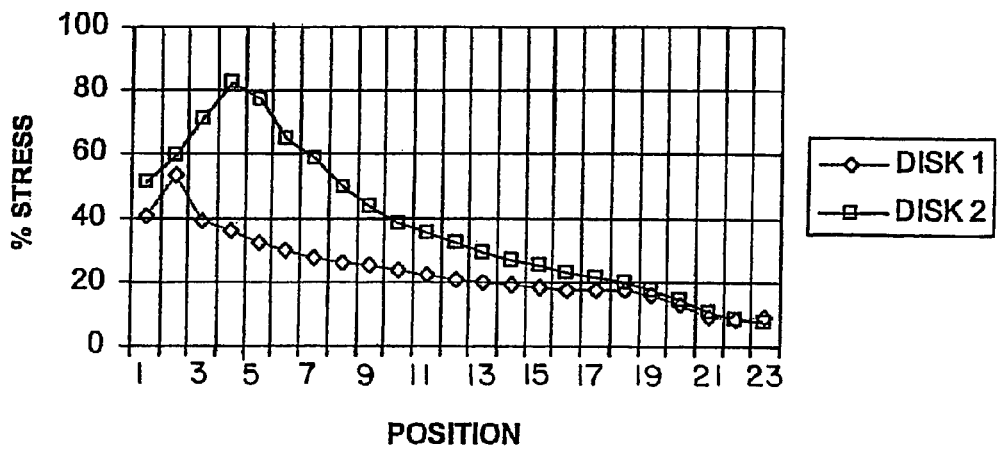
FIG. 5 is a graphical representation of torque stress at the points identified in FIG. 4.
Figure 6:
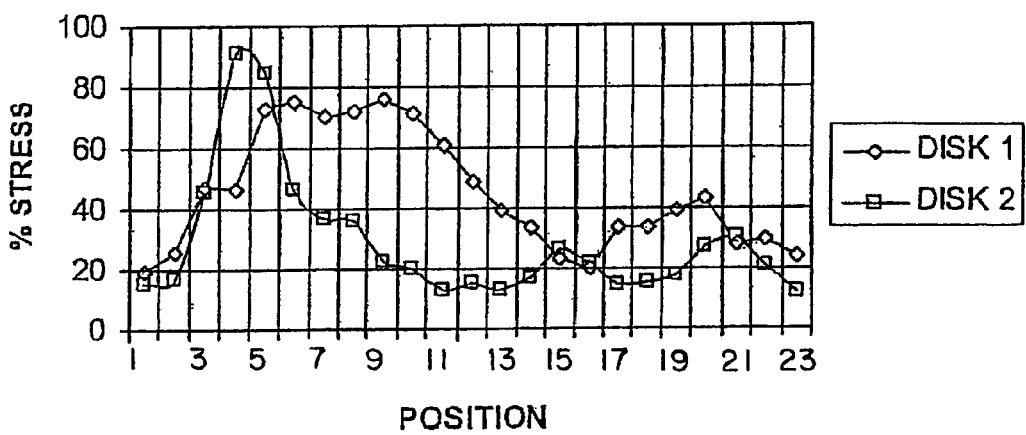
FIG. 6 is a graphical representation of stress due to angular misalignment at the points identified in FIG. 4.

Referring to FIG. 3, a cut-away view of the flexible coupling 10 is illustrated. This view provides visual access to both the interior of the coupling and to the thickness of the material of the coupling. The convolutions 14, 18, and 22 have a substantially identical cross-sectional profile, while the ends 26 and 30 also have a substantially identical cross-sectional profile, which is different than the cross-sectional profile of the convolutions 14, 18 and 22. Each end 26 and 30 includes an axial end surface 80. The axial end surface 80 intersects an inner diametrical end surface 82 and forms a sharp corner therewith. The coupling 10 comprises an inner surface 34 and outer surface 38. Between the surfaces, the thickness of material is not fixed but rather is gradually reduced with increasing radial distance from the axis of the coupling according to particular parameters that are discussed hereinbelow. Also important to note is that an outside surface beginning at the root of each convolution is radiused. In the illustrated coupling the surface is a compound radius surface. At the inside surface near the root of the convolution in an angle is formed for stress reduction reasons. The outside surface 40 and inside surface 42 are labeled in FIG. 4. FIG. 4 illustrates a representative cross section 44 of one of the convolutions of a coupling of the invention (disk 1), and superimposed thereon in broken lines (where visible), a representation of a cross section 46 of a fixed thickness coupling (disk 2). Each convolution 14, 18, 22 includes a cylindrically-shaped tip end 68 located at a radial extent of the coupling 10 which has a uniform material thickness. A convolution arm 84 extends from the cylindrically-shaped tip end 68 toward the land 70. The convolution arm 84 includes an outer wall 86 and an inner radial wall 88; the inner radial wall 88 being substantially perpendicular to the coupling axis. A convolution thickness 160 in a rounded portion 162 of the convolution 14, 18, 22 disposed between the convolution arm 84 and the cylindrically-shaped tip end 68 is substantially uniform. Each convolution 14, 18, 22 includes a root portion 90 located between the coupling arm 84 and the land 70. The root portion 90 includes a curvilinear outer root surface 92 and a chamfered inner root surface 94. The chamfered inner root surface 94 intersects the inner radial wall 88 at a first point 96 radially outwardly of a radial extent of the land 70. The chamfered inner root surface 94 intersects a radially innermost land surface 98 axially beyond an axial extent of the cylindrically-shaped tip end 68. Referring again to FIG. 3, the first end 26 and the second end 30 have an outer surface 164 including a substantially curvilinear end portion 166 disposed at the land 70 between a convolution 14, 18, 22 and the first end 26 or second end 30. The curvilinear end portion 166 is larger axially and radially than the curvilinear outer root surface 92 of the convolutions 14, 18, 22. Referring again to FIG. 4, the purpose of the illustration is to show thickness variation in the coupling disclosed herein and where stress points are measured (numerals 1-23) for a Finite Element Analysis, the results of which are graphically depicted in FIGS. 5 and 6. FIG. 5 depicts stress associated with applied torque while FIG. 6 depicts stress associated with misalignment of the shafts engaging the coupling. A reader is easily able to appreciate the reduction in stress of the coupling according to this disclosure. The coupling herein (disk 1) uses a radiused and tapered outer surface 40 and an inner angled surface 42 near the inner diameter of the flexible coupling to form a tailored thickness distribution to achieve lower stresses and an optimized stress distribution for the coupling. Specifically, the tailored wall thickness allows for a reduction in total stress, and it reduces the stress concentration and localized stress magnification that is present with uniform wall thickness designs. FIG. 5 shows that the maximum calculated stress is reduced by approximately 33% through the use of the tapered thickness distribution illustrated for the applied torque load case. In addition, the peak stress due to angular misalignment for this coupling is reduced by approximately 18% and the stress magnification effect has also been significantly reduced with a less pronounced stress peak and a more uniform stress distribution (FIG. 6).

The decreasing thickness cross section (with radial distance from the coupling axis) for the convolutions according hereto allow for tailoring of axial and bending stiffness of the coupling for natural frequency placement and resonance detuning. This is beneficial over other types of couplings with a constant thickness type configuration because such are limited in terms of stiffness control. This limitation has resulted in couplings that have had vibration problems in a drive train leading to wear at attachment points such as bolted flanges and splines. Moreover, such vibration in arrangement in which such couplings might be incorporated has even led to failure of the flexing elements in such prior art systems.

The flexible coupling 10 may be manufactured from a number of materials such as titanium, corrosion resistant steels, carbon steel, high strength steels (including Maraging steel), and nickel materials (such as Inconel) and combinations including at least one of the foregoing. A common nitriding process may optionally be utilized to create a hard shell nitride thickness and enhance durability of the coupling. Gas nitriding is preferred due to the depth of convolutions in the coupling.

Regardless of material selection, an overriding requirement is to achieve superior material and fatigue characteristics by ensuring that the coupling material has about consistent material and fatigue properties throughout. That is to say that the coupling as disclosed herein avoids localized stress risers associated with inconsistent material and fatigue properties in its constitution and construction. Achieving both of these has been elusive to the art and yields exceptional strength and durability in the coupling described herein. The disclosed coupling does not have any welds or bonds that might otherwise alter material and/or fatigue properties of the coupling material. Moreover, because the coupling does not include bonds or welds (which are for obvious reasons located at the outermost region of each disk in couplings of the prior art), and because material thickness in the coupling decreases with increasing distance from the coupling axis the center of gravity of the coupling disclosed herein is positioned more radially inward than prior art couplings have been able to achieve thereby rendering the coupling disclosed herein superior to the prior art couplings. One of the benefits of a reduced radial positioned center of gravity is that the centrifugal force acting on the coupling is much smaller than in a similarly dimensioned coupling having a center of gravity positioned more radially outwardly of the coupling axis (further from the axis of rotation of the coupling).

Figure 7:
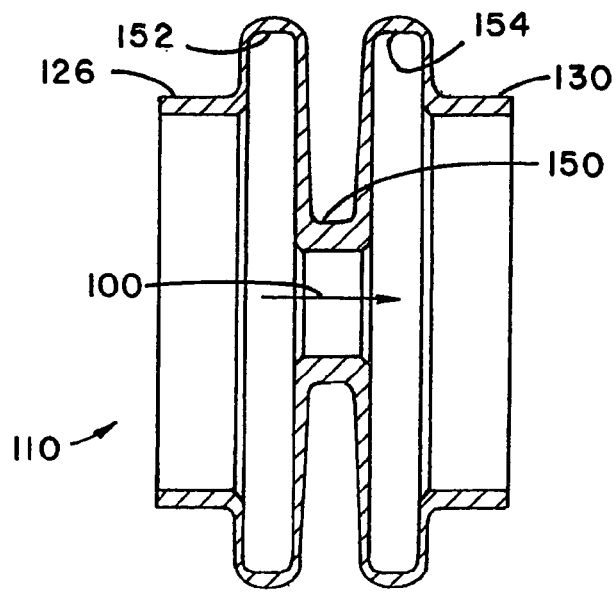
FIG. 7 is a cross-sectional view of another embodiment of the coupling.
Figure 8:
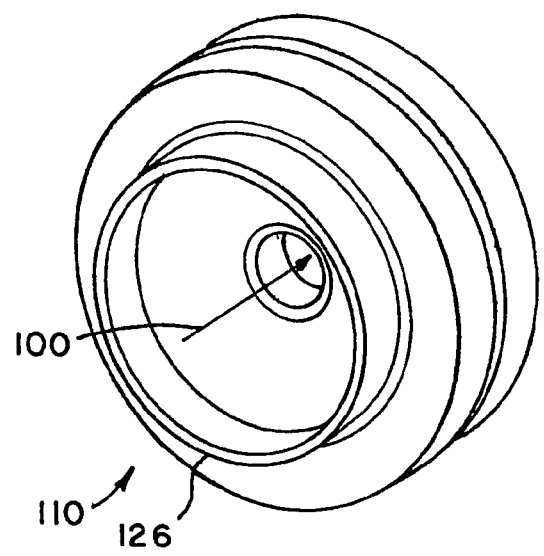
FIG. 8 is a perspective view of the embodiment of the coupling illustrated in FIG. 7.

In another embodiment hereof, and referring to FIGS. 7 and 8, the concept of the coupling illustrated above is retained but the coupling is essentially inverted (outside to inside). This embodiment is configured for smaller diameter axial opening 100 applications that would not permit machining of the deeper internal cavities due to limited size of the coupling. The coupling 110 has ends 126 and 130 which are located near the outside of the diameter of the coupling 110. One will appreciate that the larger reach machining is done from the outside of the coupling rather than the inside thereof and inside machining depth is kept to a minimum. The depth of any inside machining to be done is limited to the cutter blade length minus the blade support width in line with the blade. Therefore if a small diameter opening is required in the coupling to be produced, the depth of inside machining is limited as well. The embodiment of FIGS. 7 and 8, address this issue while still retaining much of the strength and durability of the previously described embodiments. In the illustration, a two convolution coupling is shown with the deepest machining surface at 150. It is apparent that there are two other depth machining surfaces and these are identified as 152 and 154, but these are much less deep and therefore may be machined with a smaller cutter that can be fit through the inside diameter of the coupling. Ends 126 and 130 are illustrated without any particular drive or connection arrangement but it will be understood that any of the arrangements set forth hereinbefore could be utilized.

The foregoing coupling embodiments are, as noted, constructed from a single piece of material and machined. Such a machining process was not heretofore available to the art because it is common knowledge that deep inside machining requires supported cutting tools. Such a supported cutting tool could not be employed for the couplings hereof due to end diameter versus inside machining diameters of the proposed couplings. More specifically, the cutting tool utilized must be able to fit through at least one end inside diameter and be sufficiently long to machine the deep structure of the convolution. Utilizing an unsupported tool is known to be insufficient for such use due to chatter that invariably exists at an end cutting surface of any long cutting blade. Chatter would be wholly unacceptable for a coupling such as that disclosed herein because of the inherent stress riser effect of surface irregularity of a coupling made with a chattering cutter.

Figure 9:
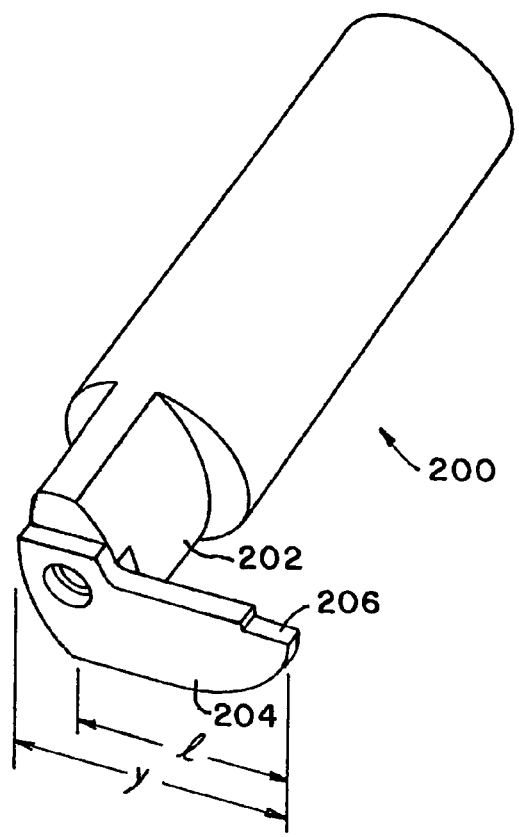
FIG. 9 is a perspective schematic representation of a milling tool to make the coupling hereof.

One of ordinary skill in the art, in view of the foregoing will immediately conclude that a coupling such as those described herein could not be machined. The inventors hereof however, have developed a cutting tool that enables the machining of the coupling as described while avoiding chatter and the deleterious effects that accompany chatter. Referring to FIG. 9, the turning milling tool 200 is illustrated. The tool comprises a mounting shaft which is clearanced at 202. At an end of clearanced section 202 is a blade 204 having a cutter 206 thereon. The blade 204 has a usable cutting length of l and is unsupported. As the blade geometry and composition (cobalt or other having equivalent material properties) have sufficient strength and do not produce chatter, the full cut length of the blade is available for machining inside portions of the coupling 10. The turning tool 200 is to be kept stationary while the coupling 10 is rotated to remove material therefrom. In operation the entire blade length y must be less than an inside dimension of at least one end 26 or 30 of the coupling 10, so that it can fit into the inside dimension of the coupling to machine the convolution(s). In a multiple convolution configuration, blade lengthy must also be less than inside dimensions at the root of each convolution so that the blade 204 may be passed through the coupling to reach and machine each convolution inside surface.

Figure 10:
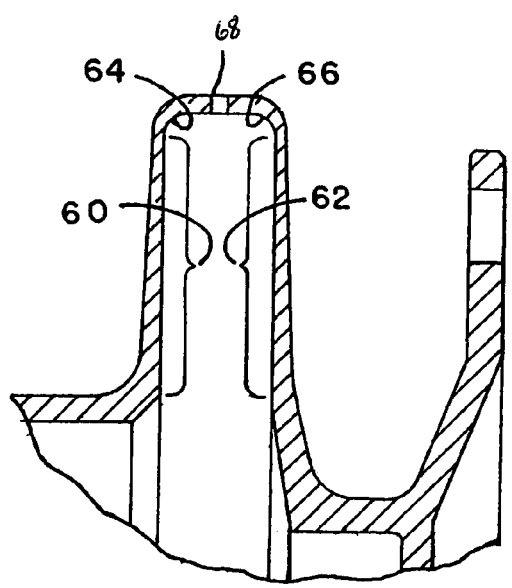
FIG. 10 is a representation cross section of a deep machined convolution illustrating inside geometry thereof.

In the making of inside surface of each convolution, the inside walls 60 and 62 (see FIG. 10) of each deep convolution are kept substantially parallel to one another and in a plane substantially perpendicular to an axis of the coupling 10 for ease of machining. At a tip end 68 of deep convolutions however, the walls are radiused at 64 and 66. Also important to the method is that the cutter is narrower than the width of the convolution to facilitate the radiused corners 64 and 66 as shown by adjusting depth and linear movement of the cutter simultaneously. The angled surface or chamfer 42 illustrated in FIG. 4 is still relatively easy to machine and together with the compound radius outer surface 40, reduces stress and helps to optimize stress distribution.

The tool discussed above is utilized in combination with a computer numerically controlled turning machine (not shown). The coupling in accordance with this disclosure will be turned from a single piece of coupling material, thus making the flexible coupling of a single piece unitary construction. Since the coupling 10 is a single piece unitary construction, it will have consistent material and fatigue properties throughout the material, the coupling 10 does not have welded parts, thus the coupling 10 does not have areas with inconsistent material and/or fatigue properties which are subject to failure. Gas nitriding further enhances the material properties and fatigue strength, while welding decreases the material properties and fatigue strength relative to the nominal heat treated properties. The operating life span of the coupling 10 is longer and more accurately predictable than the operating life span of those couplings that use welding, bonding or other attaching methods which affect the material and fatigue properties of the material. In addition, welded or bonded assemblies of prior art have been shown to have inconsistent levels of quality due to lack of repeatability of said joining processes. Moreover, due to the avoidance of heat generating attachment methods, the coupling hereof may be pre-heat treated (i.e., before machining) without risk of the benefit of that process being deleteriously affected by the later steps of construction of the coupling.

Although the disclosed flexible coupling 10 has been described with respect to computer controlled turning, other methods of machining may be used so long as welding or other bonding methods that create stress risers are not used in the convolutions. These other methods of machining include, but are not limited to electro-discharge machining (EDM) and electrochemical machining (ECM).

The use of the terms first, second, etc. do not denote any order or importance, but rather the terms first, second, etc. are used to distinguish one element from another.

The couplings disclosed herein can also utilize an anti-flail bearing known to the art. The anti-flail bearing provides a back up centering device to preserve the centerline and allow for continued rotation in the unlikely event of a failure of one of the convolutions. The anti-flail bearing combines a high speed ball bearing that is made from carbon steels, corrosion resistant materials such as Cronidur 30, XD-15, XD-15NW, ceramics, corrosion resistant steel, and plastics and a special self lubricating liner system, incorporating polytetrafluoroethylene PTFE and other special fillers in a composite matrix, on the inner or outer diameter of the high speed bearing to allow for axial misalignment of the coupling during anti-flail operation. Anti-flail bearings in general are known to the art, the changes relative to known systems that are used in this disclosure are related to materials which have been found to perform in a superior manner.

While the disclosed apparatus and method has been described with reference to a preferred embodiment, it will be understood by those skilled in the art that various changes may be made and equivalents may be substituted for elements thereof without departing from the scope of the disclosed apparatus and method. In addition, many modifications may be made to adapt a particular situation or material to the teachings of the disclosed apparatus and method without departing from the essential scope thereof. Therefore, it is intended that the disclosed apparatus and method not be limited to the particular embodiment disclosed as the best mode contemplated for carrying out this disclosed apparatus and method, but that the disclosed apparatus and method will include all embodiments falling within the scope of the appended claims.

The invention claimed is:

1. A single piece unitary metal coupling comprising:
   a first end;
   a second end; and
   a plurality of convolutions between the first and second ends, adjacent convolutions separated by a land, each convolution of the plurality of convolutions including:
   a cylindrically-shaped tip end having substantially uniform material thickness disposed at an external plateau of the convolution, relative to an axis of the coupling;
   a convolution arm extending from the cylindrically-shaped tip end toward the land and having an outer wall and an inner radial wall, the inner radial wall being substantially perpendicular to a longitudinal axis of the coupling;
   a continuously decreasing material thickness of the convolution as a radial distance from the axis of the coupling increases; and
   a root portion disposed between the land and the convolution arm, the root portion including a curvilinear outer root surface and a chamfered inner root surface, the chamfered inner root surface intersecting the inner radial wall of the convolution arm radially outwardly of a radial extent of the land, and intersecting a radially innermost surface of the land axially beyond an axial extent of the cylindrically-shaped tip end;

a convolution distance between adjacent convolutions of the plurality of convolutions being substantially equal, and less than an end distance between the first end or second end and a nearest convolution of the plurality of convolutions;

each convolution of the plurality of convolutions having a substantially identical convolution cross-sectional profile, the convolution cross-sectional profile differing from substantially identical end profiles of the first end and the second end;

a convolution thickness substantially consistent in a rounded portion of the convolution between the convolution arm and the cylindrically-shaped tip end;

the first end and the second end having an end outer diameter less than a tip end outer diameter;

the first end and the second end having a sharp corner at an intersection of an axial end surface and an inner diametrical end surface of the first end and the second end; and the first end and the second end having an outer surface including a substantially curvilinear end portion disposed at the land between the first end and the nearest convolution of the plurality of convolutions and the second end and the nearest convolution of the plurality of convolutions, the curvilinear end portion being larger axially and radially than the curvilinear root surface of each convolution of the plurality of convolutions.

2. The single piece unitary metal coupling of claim 1 wherein the coupling is cylindrical at an inside dimension thereof.

3. The single piece unitary coupling of claim 1 wherein the first and second ends include a connection arrangement.

4. The single piece unitary metal coupling of claim 3 wherein the connection arrangement is a flange.

5. The single piece unitary metal coupling of claim 1 wherein the coupling is made from a material selected from one of titanium, corrosion resistant steels, high strength steels, nickel materials, carbon steel and maraging steel, and combinations including at least one of the foregoing.

6. The single piece unitary metal coupling of claim 1 further including nitriding for enhanced fatigue properties and wear resistance.

* * * * *